(12) United States Patent
Kanitz et al.

(10) Patent No.: US 11,743,564 B2
(45) Date of Patent: Aug. 29, 2023

(54) SENSOR PLATFORM FOR AUTONOMOUS VEHICLES

(71) Applicant: UATC, LLC, San Francisco, CA (US)

(72) Inventors: Daniel Adam Kanitz, Pittsburgh, PA (US); Wesly Mason Rice, Glenshaw, PA (US); Chad Jonathan Staller, Verona, PA (US); Robert Kip Terhune, Pittsburgh, PA (US); Andrew Joseph Chellman, Glenshaw, PA (US)

(73) Assignee: UATC, LLC, Mountain View, CA (US)

( * ) Notice: Subject to any disclaimer, the term of this patent is extended or adjusted under 35 U.S.C. 154(b) by 158 days.

(21) Appl. No.: 17/138,014

(22) Filed: Dec. 30, 2020

(65) Prior Publication Data

US 2022/0132004 A1 Apr. 28, 2022

Related U.S. Application Data

(60) Provisional application No. 63/104,125, filed on Oct. 22, 2020.

(51) Int. Cl.
| | | |
|---|---|---|
| *H04N 23/54* | (2023.01) | |
| *G01S 17/931* | (2020.01) | |
| *B60W 60/00* | (2020.01) | |
| *B60R 11/04* | (2006.01) | |
| *G01S 17/86* | (2020.01) | |

(Continued)

(52) U.S. Cl.
CPC ............ *H04N 23/54* (2023.01); *B60R 11/04* (2013.01); *B60W 60/001* (2020.02); *G01S 17/86* (2020.01); *G01S 17/931* (2020.01); *H04N 23/51* (2023.01); *H04N 23/90* (2023.01); *B60R 2011/004* (2013.01); *B60W 2420/42* (2013.01); *B60W 2420/52* (2013.01)

(58) Field of Classification Search
CPC .... H04N 5/247; H04N 5/2252; H04N 5/2253; G01S 17/86; G01S 17/931; B60W 60/001; B60W 2420/42; B60W 2420/52; B60R 11/04; B60R 2011/004
USPC .......................................................... 348/148
See application file for complete search history.

(56) References Cited

U.S. PATENT DOCUMENTS

| | | | |
|---|---|---|---|
| 10,578,716 B1 * | 3/2020 | Hu ........................ | G01S 13/931 |
| 2016/0016312 A1 * | 1/2016 | Lawrence, III ........ | B25J 9/1697 |
| | | | 901/41 |

(Continued)

FOREIGN PATENT DOCUMENTS

| | | |
|---|---|---|
| EP | 3514487 A1 | 7/2019 |

OTHER PUBLICATIONS

International Search Report and Written Opinion for Application No. PCT/US2021/056207, dated Feb. 24, 2022, 12 pages.

*Primary Examiner* — Christopher S Kelley
*Assistant Examiner* — Asmamaw G Tarko
(74) *Attorney, Agent, or Firm* — Dority & Manning, P.A.

(57) ABSTRACT

A near-range camera assembly for a vehicle is provided. The near-range camera assembly includes a LIDAR mount couplable to a vehicle. The LIDAR mount includes a first surface and a second surface that opposes the first surface. The near-range camera assembly includes a LIDAR unit removably coupled to the first surface LIDAR mount. The near-range camera assembly further includes a camera and a camera housing for the camera. The camera housing is removably coupled to the second surface LIDAR mount.

18 Claims, 11 Drawing Sheets

(51) Int. Cl.
*H04N 23/51* (2023.01)
*H04N 23/90* (2023.01)
*B60R 11/00* (2006.01)

(56) References Cited

U.S. PATENT DOCUMENTS

| | | |
|---|---|---|
| 2018/0329066 A1* | 11/2018 | Pacala .................. H04N 5/2353 |
| 2019/0004535 A1* | 1/2019 | Huang .................. G01S 7/4808 |
| 2020/0114877 A1* | 4/2020 | Hu ........................ G01S 7/4813 |
| 2020/0301012 A1* | 9/2020 | Yamamoto ............. G01S 15/08 |
| 2021/0201054 A1* | 7/2021 | Toth ....................... G01S 17/894 |
| 2021/0276494 A1* | 9/2021 | Impola .................... E01C 19/26 |
| 2022/0014686 A1* | 1/2022 | Lawler ................... H04N 23/66 |

\* cited by examiner

SENSOR PLATFORM FOR AUTONOMOUS VEHICLES

RELATED APPLICATION

The present application is based on and claims benefit of U.S. Provisional Patent Application No. 63/104,125 having a filing date of Oct. 22, 2020, which is incorporated by reference herein.

FIELD

The present disclosure relates generally to vehicles and, more particularly, a sensor platform for mounting a light detection and ranging (Lidar) unit and a camera to an autonomous vehicle.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given such knowledge, an autonomous vehicle can navigate through the environment.

SUMMARY

Aspects and advantages of embodiments of the present disclosure will be set forth in part in the following description, or may be learned from the description, or may be learned through practice of the embodiments.

In one aspect, a mounting assembly for a near-range camera assembly comprising a LIDAR unit and a camera is provided. The mounting assembly includes a LIDAR mount couplable to an autonomous vehicle. The LIDAR mount includes a first surface and a second surface that is opposite the first surface. The mounting assembly further includes a camera housing removably coupled to the LIDAR mount. When the LIDAR unit is coupled to the LIDAR mount, the LIDAR unit is coupled to the first surface of the LIDAR mount. Conversely, when the camera housing is coupled to the LIDAR mount, the camera housing is coupled to the second surface of the LIDAR mount.

In another aspect, a near-range camera assembly is provided. The near-range camera assembly includes a LIDAR mount couplable to an autonomous vehicle. The LIDAR mount includes a first surface and a second surface that is opposite the first surface. The near-range camera assembly includes a LIDAR unit removably coupled to the first surface of the LIDAR mount. The near-range camera assembly includes a camera and a camera housing. The camera housing is removably coupled to the second surface of the LIDAR mount.

In yet another aspect, an autonomous vehicle is provided. The autonomous vehicle includes a vehicle body and a plurality of near-range camera assemblies. Each of the near-range camera assemblies is coupled to the vehicle body at a different location. Each of the plurality of near-range camera assemblies include a LIDAR mount couplable to the vehicle body. The LIDAR mount includes a first surface and a second surface that is opposite the first surface. Each of the plurality of near-range camera assemblies includes a LIDAR unit removably coupled to the first surface of the LIDAR mount. Each of the plurality of near-range camera assemblies further includes a camera and a camera housing for the camera. The camera housing is removably coupled to the second surface of the LIDAR mount.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
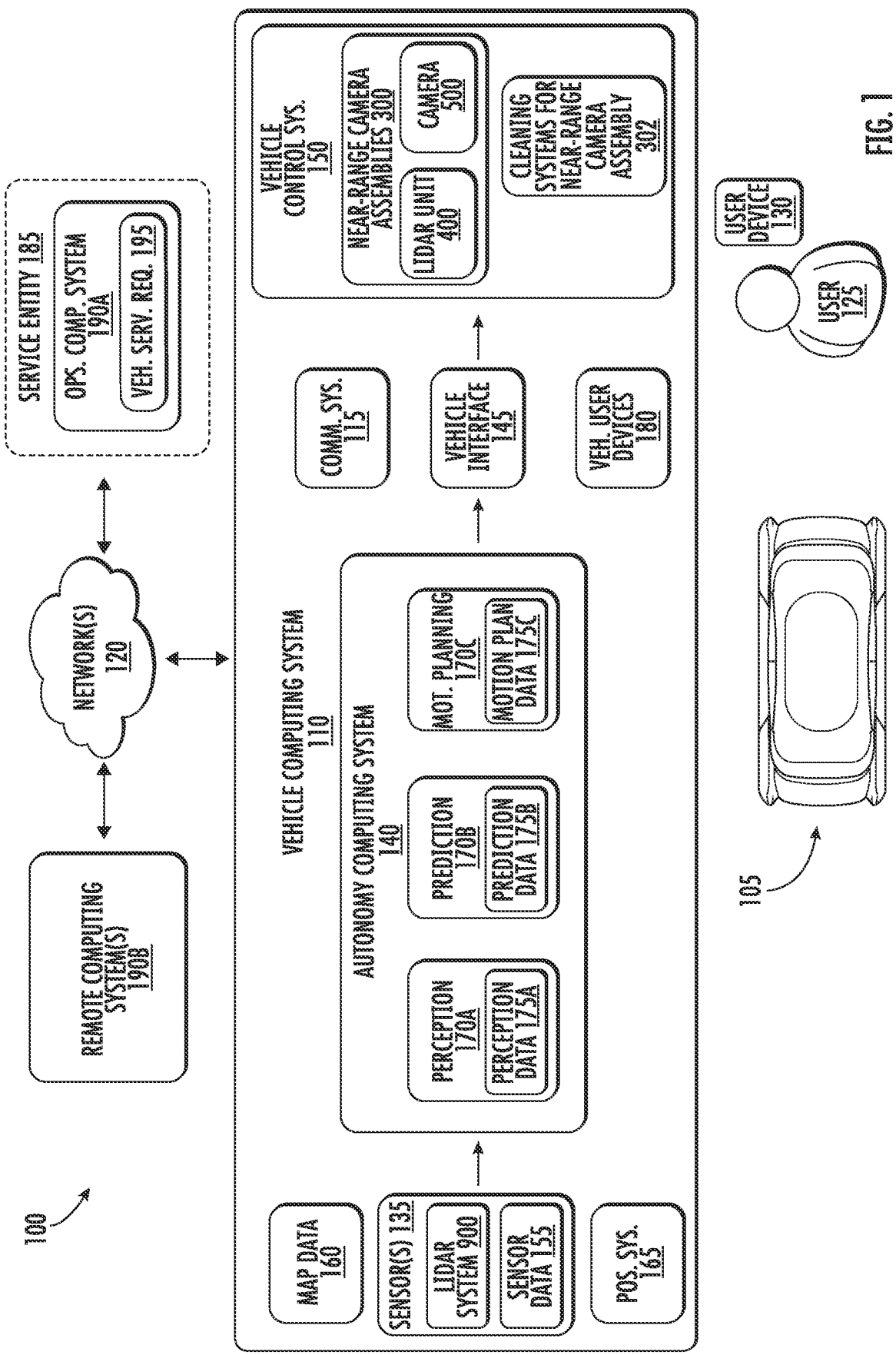
FIG. 1 depicts a block diagram of an example system for controlling an autonomous vehicle according to example embodiments of the present disclosure.

Example aspect of the present disclosure are directed to a near-range camera assembly for vehicles. The near-range camera assembly can include a LIDAR unit and a camera. The LIDAR unit can include a housing. The LIDAR unit can further include one or more emitters disposed within the housing and one or more receivers disposed within the housing. The one or more emitters can include a laser source configured to emit a laser beam. The one or more receivers can include a detector (e.g., photodetector) configured to detect a reflected laser beam. In some implementations, multiple near-range camera assemblies can be removably mounted to a vehicle body of the vehicle. Furthermore, in such implementations, each of the near-range camera assemblies can be removably coupled to the vehicle body at a different location (e.g., front bumper, rear bumper, door frame).

The near-range camera assembly can include a sensor platform or mounting assembly to facilitate coupling the near-range camera assembly to a vehicle. The mounting assembly can include a LIDAR mount for the LIDAR unit. The LIDAR mount can be couplable to a vehicle body (e.g., front bumper, rear bumper, door frame, etc.) of the vehicle. For instance, in some implementations, the LIDAR mount can be directly coupled to the vehicle body. In alternative implementations, the LIDAR mount can be coupled to the vehicle body via one or more brackets.

The mounting assembly can further include a camera mount or camera housing for the camera. The camera housing can be removably coupled to LIDAR mount at a different location than the LIDAR unit. For instance, the LIDAR unit can be removably coupled to a first surface of the LIDAR mount. In some implementations, the LIDAR unit can contact the first surface of the LIDAR mount when the LIDAR unit is coupled thereto. Conversely, the camera housing can be removably coupled to a second surface of the LIDAR mount. For instance, in some implementations, the first surface of the LIDAR mount and the second surface of the LIDAR mount can correspond to opposing surfaces of the LIDAR mount. In some implementations, a portion of the camera housing can contact the second surface of the LIDAR mount when the camera housing is coupled thereto.

In some implementations, the camera housing can be removably coupled to the LIDAR mount via one or more fasteners that are separate from one or more fasteners used to couple the LIDAR unit to the LIDAR mount. In this manner, the LIDAR unit and the camera housing can be independently coupled to the LIDAR mount. This allows technicians to remove the LIDAR unit to perform maintenance thereon without also removing the camera housing. Likewise, technicians can remove the camera housing to perform a maintenance action on the camera without also removing the LIDAR unit.

The camera housing can be removably coupled to the LIDAR mount such that the camera is oriented at an acute angle relative to the LIDAR mount when the camera is positioned within the camera housing. In this manner, a field of view of the camera can include a larger portion of objects (e.g., pedestrian, bicycle) in close proximity (e.g., less than 10 meters, less than 5 meters, etc.) to the autonomous vehicle. For instance, in some implementations, the acute angle can be less than about 20 degrees. Furthermore, in some implementations, the field of view of the camera can intersect a field of view of the LIDAR unit due, at least in part, to the camera being tilted at an acute angle relative to the LIDAR mount.

In some implementations, the mounting assembly can include a cover that is removably coupled to the LIDAR mount. The cover can define a first opening and a second opening. The LIDAR unit can be positioned within the first opening when the cover is coupled to the LIDAR mount. Furthermore, a portion (e.g., lens) of the camera can be positioned within the second opening when the cover is coupled to the LIDAR mount. As such, the first opening can be larger than the second opening. The cover can protect the mounting assembly (e.g., LIDAR mount, camera housing) from debris.

In some implementations, the mounting assembly can include a retention plate positioned to retain the camera within the camera housing. Furthermore, in some implementations, the mounting assembly can include a spring plate positioned between the retention plate and the camera housing such that the retention plate exerts a force on the camera via the spring plate to retain the camera within the housing. More specifically, the force can restrict movement of the camera relative to the camera housing such that the lens of the camera remains positioned within an opening defined by the camera housing.

In some implementations, debris can be cleaned from the LIDAR unit and the camera via one or more cleaning systems. For instance, the one or more cleaning systems can include a first cleaning system and a second cleaning system. The first cleaning system can be configured to clean debris from the housing of the LIDAR unit. The second cleaning system can be configured to clean debris from the lens of the camera. In some implementations, the first cleaning system and/or the second cleaning system can include an air knife system.

In some implementations, the first cleaning system and the second cleaning system can operate concurrently. In this manner, debris can be cleaned from the housing of the LIDAR unit and the lens of the camera at the same time. In alternative implementations, the first cleaning system and the second cleaning system can be operated at different times. For instance, in some implementations, the first cleaning system can be operated to clean debris from the housing of the LIDAR unit when a speed of the vehicle is greater than a first threshold value (e.g., 5 MPH) and less than a second threshold value (e.g., 20 MPH). Conversely, the second cleaning system can be operated when the speed of the vehicle is less than the first threshold value. For instance, the second cleaning system can be operated to clean debris from the lens of the camera when the autonomous vehicle is idle (e.g., not moving) at an intersection. Furthermore, in some implementations, operation of the first cleaning system and the second cleaning system can be prohibited when the speed of the autonomous vehicle is above the second threshold value. For example, operation of the first cleaning system and the second cleaning system when the autonomous vehicle is traversing a highway or interstate.

An autonomous vehicle can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. As an example, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

An operations computing system of the service entity can help to coordinate the performance of vehicle services by autonomous vehicles. For instance, the operations computing system can include a service platform. The service platform can include a plurality of back-end services and front-end interfaces, which are accessible via one or more APIs. For example, an autonomous vehicle and/or another computing system that is remote from the autonomous vehicle can communicate/access the service platform (and its backend services) by calling the one or more APIs. Such components can facilitate secure, bidirectional communications between autonomous vehicles and/or the service entity's operations system (e.g., including a data center, etc.).

The service platform can allow an autonomous vehicle to obtain data from and/or communicate data to the operations computing system. By way of example, a user can provide (e.g., via a user device) a request for a vehicle service to the operations computing system associated with the service entity. The request can indicate the type of vehicle service that the user desires (e.g., a user transportation service, a delivery service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information. The operations computing system of the service entity can process the request and identify one or more autonomous vehicles that may be able to perform the requested vehicle services for the user. For instance, the operations computing system can identify which autonomous vehicle(s) are online with the service entity (e.g., available for a vehicle service assignment, addressing a vehicle service assignment, etc.). An autonomous vehicle can go online with a service entity by, for example, connecting with the service entity's operations computing system (e.g., the service platform) so that the vehicle computing system can communicate with the operations computing system via a network. Once online, the operations computing system can communicate a vehicle service assignment indicative of the requested vehicle services and/or other data to the autonomous vehicle.

In some implementations, the near-range camera assembly can be implemented on an autonomous vehicle. The autonomous vehicle (e.g., ground-based vehicle, aerial vehicle, light electric vehicle, etc.) can include various systems and devices configured to control the operation of the vehicle. For example, an autonomous vehicle can include an onboard vehicle computing system (e.g., located on or within the autonomous vehicle) that is configured to operate the autonomous vehicle. The vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. Moreover, an autonomous vehicle can include a communications system that can allow the vehicle to communicate with a computing system that is remote from the vehicle such as, for example, that of a service entity.

The autonomous vehicle's sensor(s) can be configured to acquire sensor data. The sensor(s) can be external sensors configured to acquire external sensor data. This can include sensor data associated with the surrounding environment of the vehicle. The surrounding environment of the vehicle can include/be represented in the field of view of the sensor(s). For instance, the sensor(s) can acquire image and/or other data of the environment outside of the vehicle and within a range and/or field of view of one or more of the sensor(s). The sensor(s) can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The sensor data can include image data (e.g., 2D camera data, video data, etc.), RADAR data, LIDAR data (e.g., 3D point cloud data, etc.), audio data, and/or other types of data. The one or more sensors can be located on various parts of the vehicle including a front side, rear side, left side, right side, top, and/or bottom of the vehicle. As described herein, the sensor(s) can be mounted to the exterior of the autonomous vehicle.

In some implementations, the sensor(s) can include one or more internal sensors. The internal sensor(s) can be configured to acquire sensor data associated with the interior of the autonomous vehicle. For example, the internal sensor(s) can include one or more cameras (e.g., cabin cameras), one or more infrared sensors, one or more motion sensors, one or more weight sensors (e.g., in a seat, in a trunk, etc.), and/or other types of sensors. The sensor data acquired via the internal sensor(s) can include, for example, image data indicative of a position of a passenger or item located within the interior (e.g., cabin, trunk, etc.) of the vehicle. This information can be provided to a remote computing system (e.g., of the service entity) and used, for example, to ensure the safety/comfort of the passenger, to prevent an item from being left by a passenger, confirm the cleanliness of the vehicle, remotely assist a passenger, confirm that special accommodations are available and met for a passenger (e.g., wheelchair is positioned correctly and secured), etc.

The mounting assembly for the near-range camera assembly can provide numerous technical effects and benefits. For instance, the LIDAR unit and the camera can be serviced independent of one another, because the LIDAR unit and the camera housing are independently coupled to the LIDAR mount. Furthermore, since the LIDAR unit is coupled to the LIDAR mount at a fixed location (e.g., first surface thereof), the LIDAR unit does not need to be recalibrated each time the LIDAR unit is recoupled to the LIDAR mount after being serviced. Likewise, since the camera housing is coupled to the LIDAR mount at a fixed location (e.g., second surface thereof), the camera does not need to be recalibrated each time the camera housing is recoupled to the LIDAR mount. Still further, since the camera housing is removably coupled to the LIDAR mount such that the camera is positioned at an acute angle relative to the LIDAR mount, the camera can be oriented such that a field of view thereof includes a larger portion of objects (e.g., pedestrian, bicyclist) in close proximity to the autonomous vehicle. In this manner, classification of objects depicted in images obtained via the camera can be improved since a larger portion of the objects is included in the field of view of the camera due, at least in part, to the camera being oriented at an acute angle relative to the LIDAR mount.

Referring now to the FIGS., FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 110 can be located onboard the vehicle 105 (e.g., it can be included on and/or within the vehicle 105).

The vehicle 105 incorporating the vehicle computing system 110 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a light weight elective vehicle (e.g., bicycle, scooter, etc.). The vehicle 105 can be another type of vehicles (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for controlling an autonomous vehicle, communicating with other computing systems, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 140 can obtain the sensor data 155 via the sensor(s) 135, process the sensor data 155

(and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via difference sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects that within the surrounding environment of the vehicle 105 based at least in part on the sensor data 155 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170C, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 175B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 175B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more way points (with associated coordinates). The planned vehicle motion trajectories can indicate the path the vehicle 105 is to follow as it traverses a route from one location to another. Thus, the vehicle computing system 110 can take into account a route/route data when performing the motion planning function 170C.

The motion planning system 170C can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning system 170C can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and a corresponding planned vehicle motion trajectories. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 15. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of the vehicle 105 can provide user input to adjust a destination location of the vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190 (e.g., its one or more processors, etc.) to perform operations and functions, such as those described herein matching users and vehicles/vehicle fleets, deploying vehicles, facilitating the provision of vehicle services via autonomous vehicles, etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 194 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The vehicle service request 195 can indicate a type/size/class of vehicle such as, for example, a sedan, an SUV, luxury vehicle, standard vehicle, etc. The vehicle service request 195 can indicate a product of the service entity 185. For example, the vehicle service request 195 can indicate that the user is requesting a transportation pool product by which the user would potentially share the vehicle (and costs) with other users/items. In some implementations, the vehicle service request 195 can explicitly request for the vehicle service to be provided by an autonomous vehicle or a human-driven vehicle. In some implementations, the vehicle service request 195 can indicate a number of users that will be riding in the vehicle/utilizing the vehicle service. In some implementations, the vehicle service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 125. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

In some implementations, the vehicle control systems 150 can be configured to control operation of each of a plurality of near-range camera assemblies 300 of the vehicle 105. Details of the one or more near-range camera assemblies 300 will be discussed below in more detail. However, it should be understood that the one or more near-range camera assemblies 300 can include a LIDAR unit 400 and a camera 500. The vehicle control systems 150 can be configured to control operation of one or more cleaning systems 302 associated with each of the plurality of near-range camera assemblies 300. For instance, in some implementations, the one or more cleaning systems 302 can include an air knife system. Alternatively, or additionally, the vehicle control systems 150 can be configured to control operation of a first cleaning system associated with cleaning debris from the LIDAR unit 400 of of a first near-range camera assembly of the plurality of near-range camera assemblies 300. In addition, the vehicle control systems 150 can be configured to control operation of a second cleaning system associated with cleaning debris from a lens of the camera 500 of the first near-range camera assembly of the plurality of near-range camera assemblies 300.

In some implementations, the first cleaning system and the second cleaning system can operate concurrently. In this manner, debris can be cleaned from the housing of the LIDAR unit and the lens of the camera at the same time. In alternative implementations, the first cleaning system and the second cleaning system can be operated at different times. For instance, in some implementations, the first cleaning system can be operated to clean debris from the housing of the LIDAR unit when a speed of the vehicle is greater than a first threshold value (e.g., 5 MPH) and less than a second threshold value (e.g., 20 MPH). Conversely, the second cleaning system can be operated when the speed of the vehicle is less than the first threshold value. For instance, the second cleaning system can be operated to clean debris from the lens of the camera when the autonomous vehicle is idle (e.g., not moving) at an intersection. Furthermore, in some implementations, operation of the first cleaning system and the second cleaning system can be prohibited when the speed of the autonomous vehicle is above the second threshold value. For example, operation of the first cleaning system and the second cleaning system when the autonomous vehicle is traversing a highway or interstate.

Figure 2:
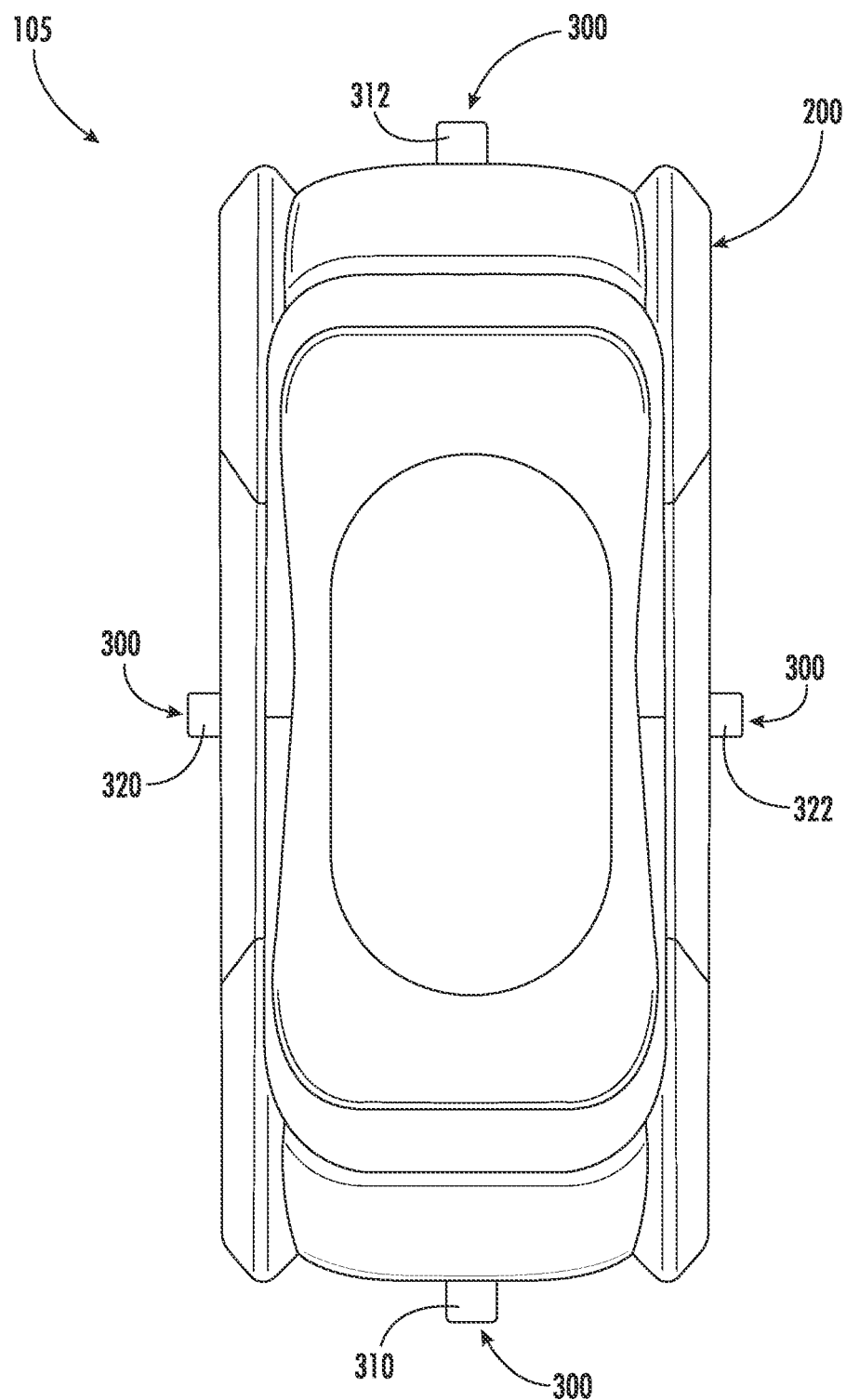
FIG. 2 depicts a top view of an autonomous vehicle having a plurality of near-range camera assemblies located at different locations thereon according to example embodiments of the present disclosure.
Figure 3:
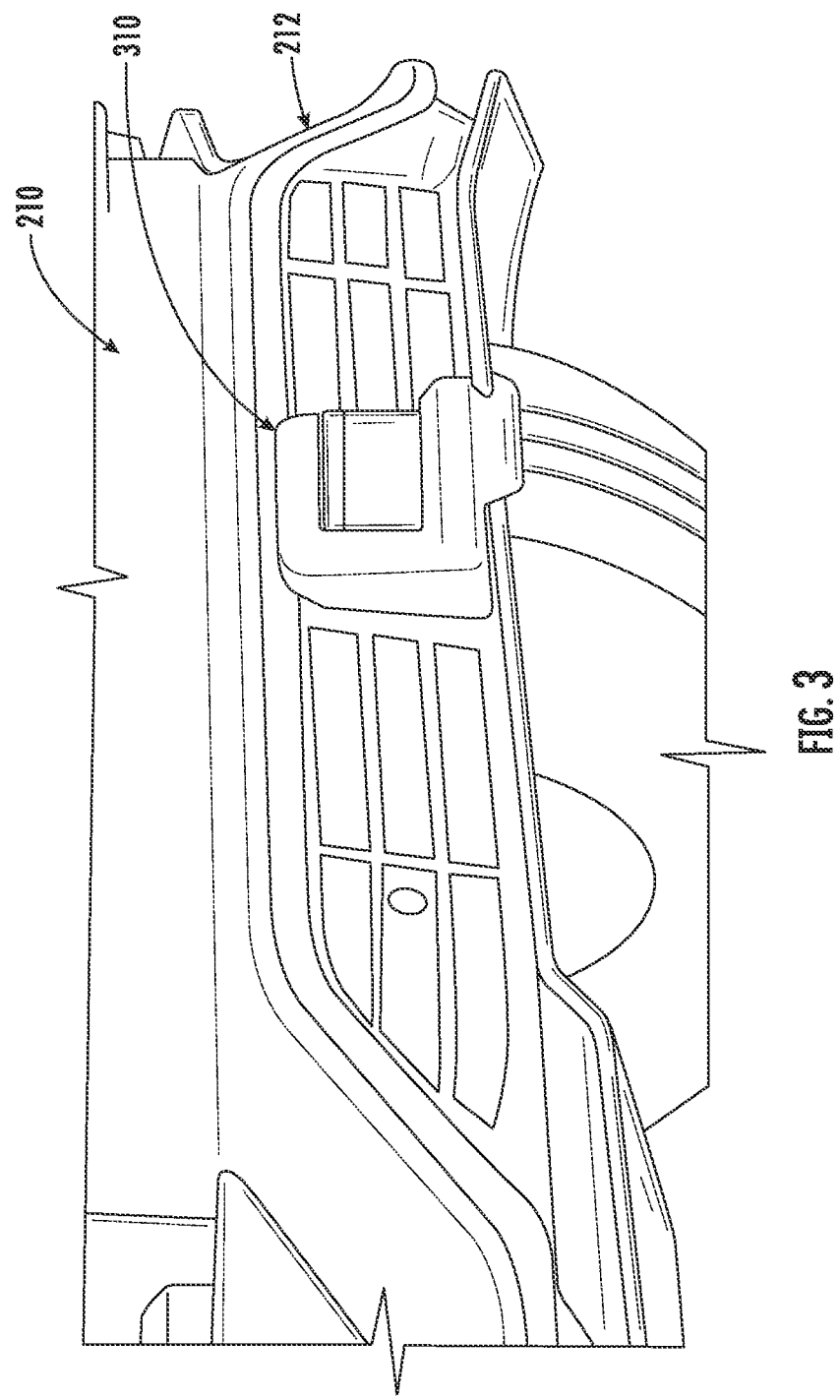
FIG. 3 depicts a near-range camera assembly mounted to a grille of an autonomous vehicle according to example embodiments of the present disclosure.

Referring now to FIGS. 2 and 3, the vehicle 105 can include a vehicle body 200. It should be understood that the vehicle body 200 can include a frame and/or body trim panels (e.g., front bumper, rear bumper, etc.). As shown, the plurality of near-range camera assemblies 300 coupled to the vehicle body 200. For instance, in some implementations, the vehicle 105 can include a first near-range camera assembly 310, a second near-range camera assembly 312, a third near-range camera assembly 320, and a fourth near-range camera assembly 322. In alternative implementations, the vehicle 105 can include more or fewer near-range camera assemblies 300.

As shown, the first near-range camera assembly 310 and the second near-range camera assembly 312 can be coupled to opposing ends (e.g., front end and rear end) of the vehicle body 200. For instance, the first near-range camera assembly 310 can be coupled to a front bumper 210 of the vehicle body 200. More particularly, the first near-range camera assembly 310 can be coupled to a front grille 212 of the front bumper 210. Conversely, the second near-range camera assembly 312 can be coupled to a rear bumper of the vehicle body 200. As shown, the third near-range camera assembly 320 and the fourth near-range camera assembly 322 can be coupled to opposing sides of the vehicle body 200.

Figure 4:
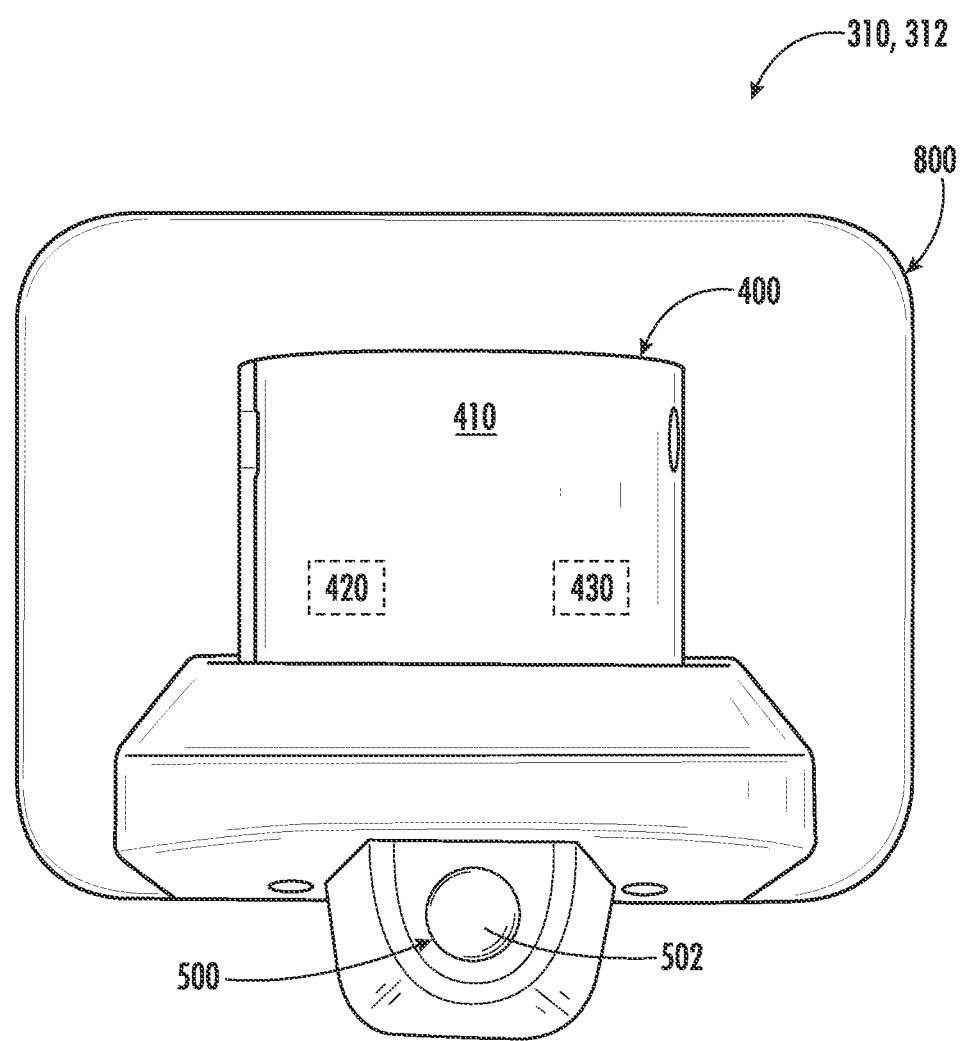
FIG. 4 depicts a near-range camera assembly according to example embodiments of the present disclosure

Referring now to FIG. 4, a front view of the first near-range camera assembly 310 and the second near-range camera assembly 312 is provided according to example embodiments of the present disclosure. As shown, the first near-range camera assembly 310 and the second near-range camera assembly 312 can each include a LIDAR unit 400. The LIDAR unit 400 can include a housing 410. The LIDAR unit 400 can further include one or more emitters 420 disposed within the housing 410 and one or more receivers 430 disposed within the housing 410. The one or more emitters 420 can include a laser source configured to emit a laser beam. The one or more receivers 430 can include a detector (e.g., photodetector) configured to detect a reflected laser beam. The first near-range camera assembly 310 and the second near-range camera assembly 312 can further include a camera 500 having a camera lens 502. In some implementations, the camera 500 can have a field-of-view of about 360 degrees. For instance, in some implementations, the camera lens 502 can be a fisheye lens.

Figure 5:
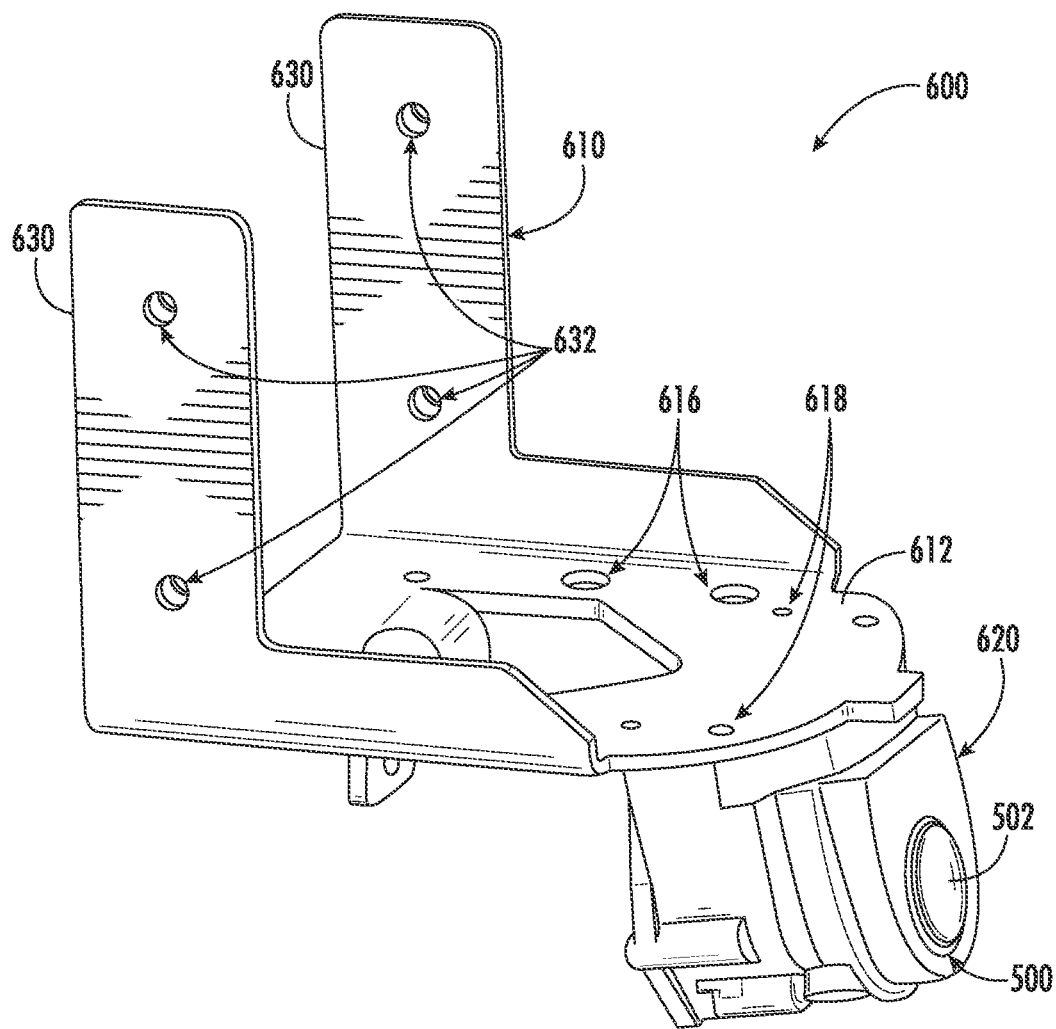
FIG. 5 depicts a top perspective view of a mounting assembly for a near-range camera assembly according to example embodiments of the present disclosure.
Figure 6:
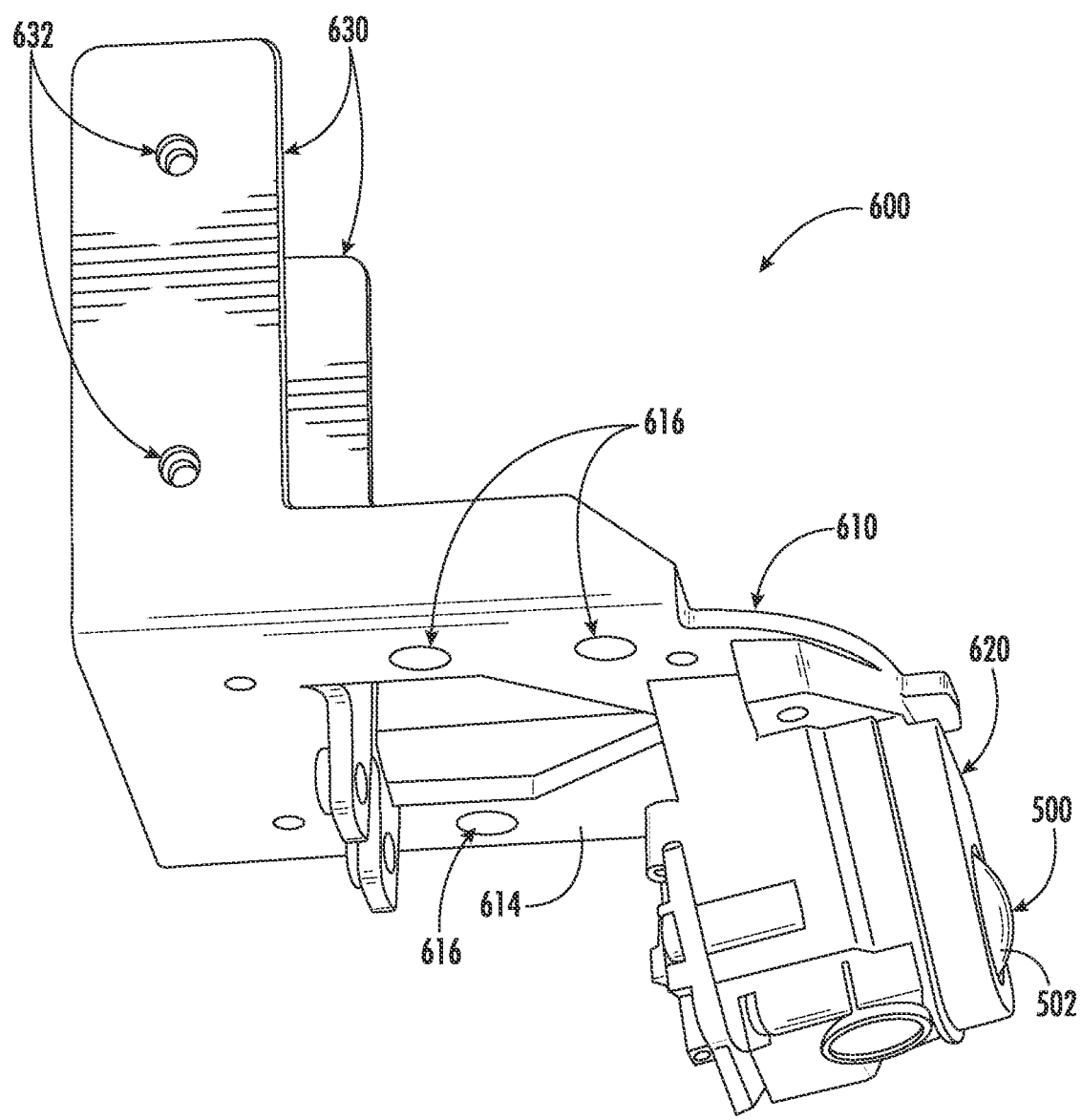
FIG. 6 depicts a bottom perspective view of the mounting assembly of FIG. 5 according to example embodiments of the present disclosure.
Figure 7:
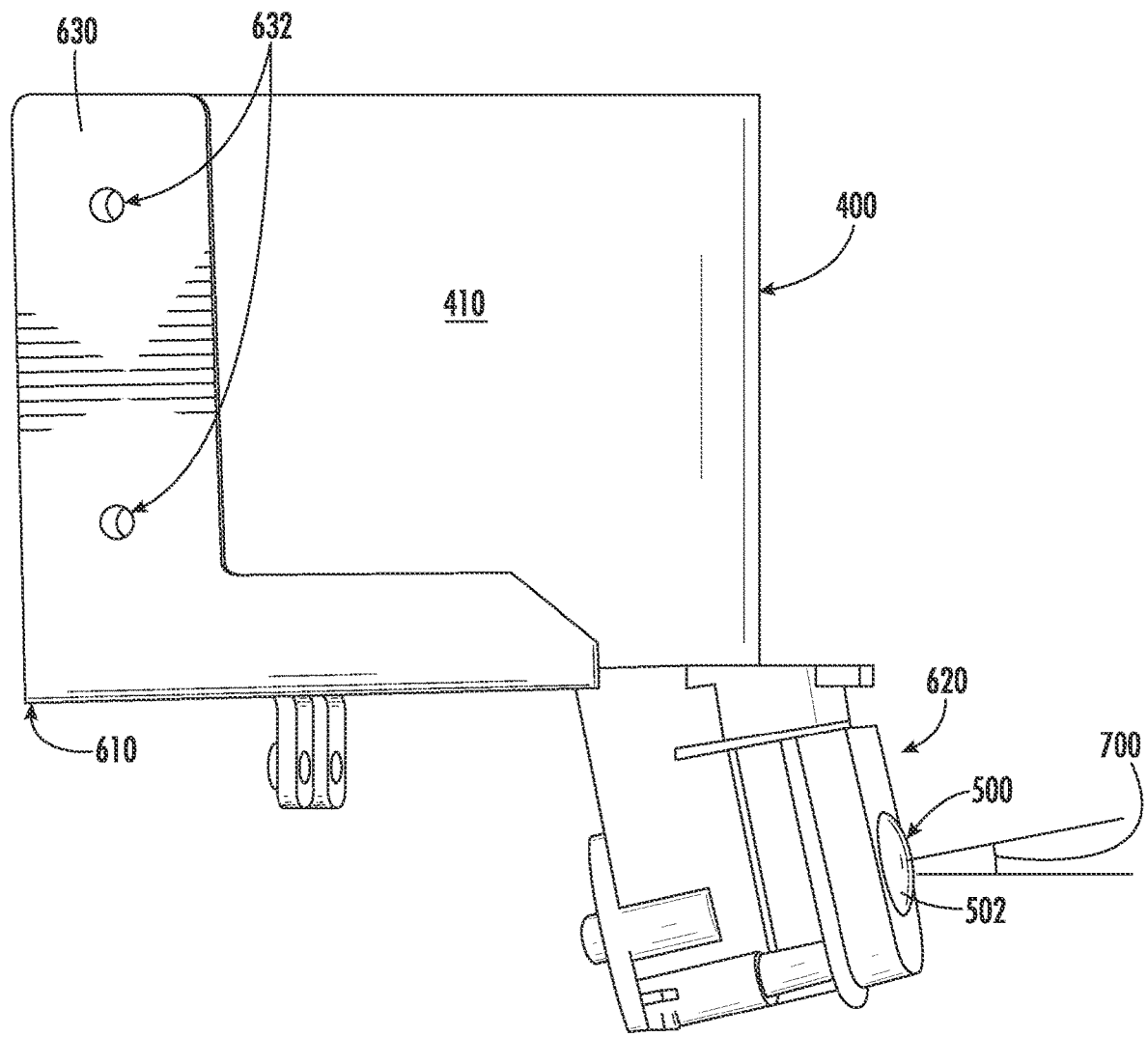
FIG. 7 depicts a side view of the mounting assembly of FIG. 5 according to example embodiments of the present disclosure.

Referring now to FIGS. 5-7, the first near-range camera assembly 310 and the second near-range camera assembly 312 can each include a sensor platform or mounting assembly 600 to facilitate coupling the LIDAR unit 400 (FIG. 4) and the camera 500 to the vehicle body 200 (FIG. 2). As shown, the mounting assembly 600 can include a LIDAR mount 610 and a camera mount or camera housing 620. The LIDAR mount 610 can be configured to accommodate the LIDAR unit 400 (FIG. 4). The camera housing 620 can be configured to accommodate the camera 500.

In some implementations, the LIDAR mount 610 can include one or more LIDAR brackets 630 to facilitate coupling the mounting assembly 600 to the vehicle body 200 (FIG. 3) of the vehicle 105 (FIG. 2). For instance, in some implementations, the one or more LIDAR brackets 630 can be countable to one or more additional components (e.g., brackets). In alternative implementations, the LIDAR bracket 630 can be directly mounted to the vehicle body 200 of the vehicle 105 without the one or more additional components. It should be understood that the one or more LIDAR brackets 630 define a plurality of apertures 632 to accommodate mechanical fasteners (e.g., bolts, screw, etc.) used to couple the LIDAR mount 610 to the vehicle body 200 (FIG. 2) or the one or more additional components.

The LIDAR unit 400 (FIG. 4) can be coupled to the LIDAR mount 610 such that the LIDAR unit 400 is positioned on a first surface 612 of the LIDAR mount 610. The camera housing 620 can be coupled to the LIDAR mount 610 such that the camera housing 620 is positioned on a second surface 614 of the LIDAR mount 610. As shown, the second surface 614 can be opposite the first surface 612. In some implementations the LIDAR mount 610 can define a first plurality of apertures 616 to accommodate mechanical fasteners (e.g., bolts, screws, etc.) associated with coupling the LIDAR unit 400 to the LIDAR mount 610 such that the LIDAR unit 400 is positioned on the first surface 612 of the LIDAR mount 610. Additionally, the LIDAR mount 610 can define a second plurality of apertures 618 to accommodate mechanical fasteners (e.g., bolts, screws, etc.) associated with coupling the camera housing 620 to the LIDAR mount 610 such that the camera housing 620 is positioned on the second surface 614 of the LIDAR mount 610. It should be understood that the first plurality of apertures 616 and the second plurality of apertures 618 extend through the first surface 612 of the LIDAR mount 610 and the second surface 614 of the LIDAR mount 610.

As shown, the camera housing 620 can be removably coupled to the LIDAR mount 610 such that the camera 500 is oriented at an acute angle 700 relative to the LIDAR mount 610 when the camera 500 is positioned within the camera housing 620. In this manner, a field of view of the camera 500 can include a larger portion of objects (e.g., pedestrian, bicycle) in close proximity (e.g., less than 10 meters, less than 5 meters, etc.) to the vehicle 105 (FIG. 2). For instance, in some implementations, the acute angle 700 can be less than about 20 degrees. Furthermore, in some implementations, the field of view of the camera 500 can intersect a field of view of the LIDAR unit 400 due, at least in part, to the camera 500 being tilted relative to the LIDAR mount 610 at the acute angle 700.

Figure 8:
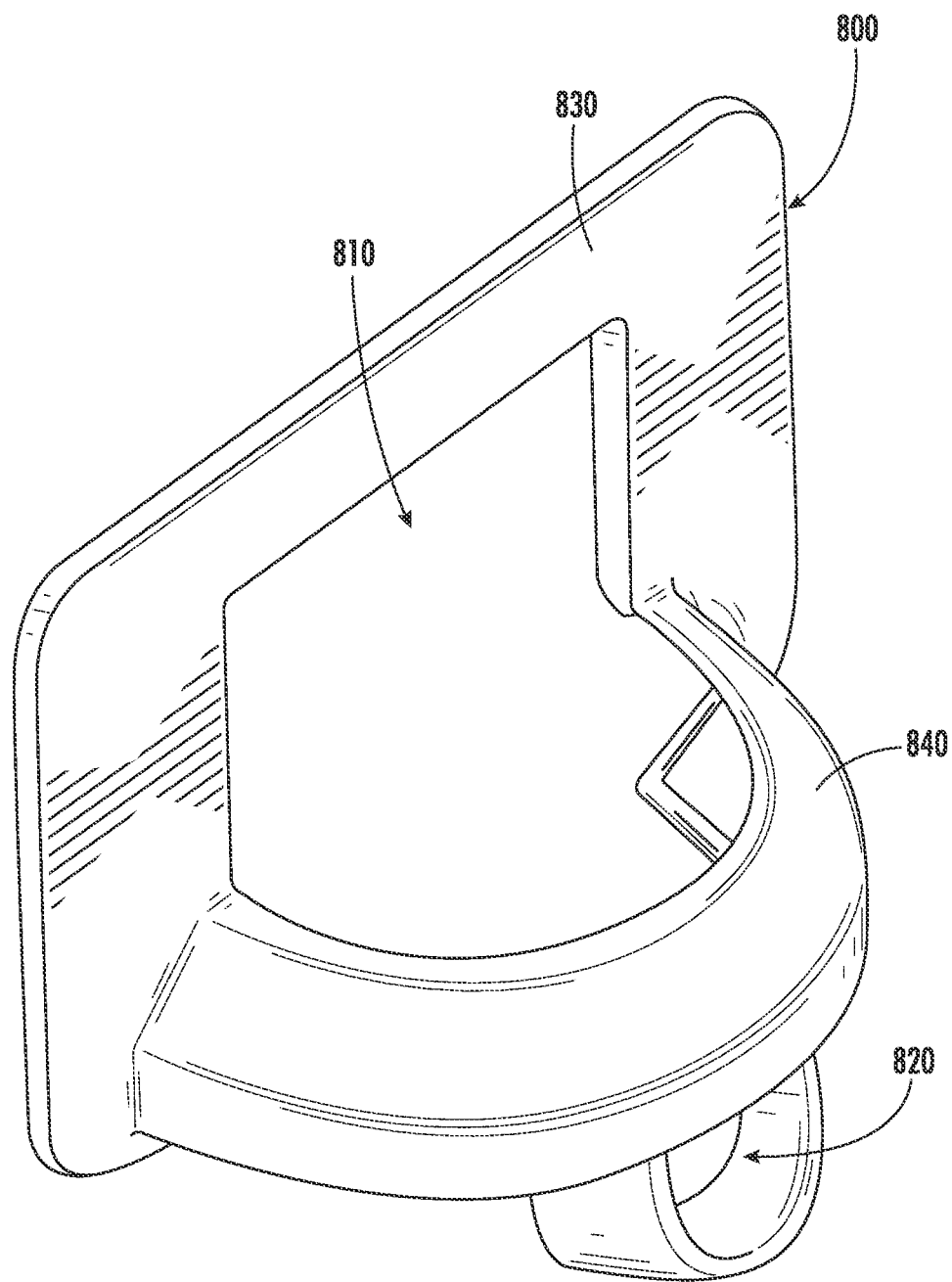
FIG. 8 depicts a cover of a mounting assembly for a near-range camera assembly according to example embodiments of the present disclosure.
Figure 9:
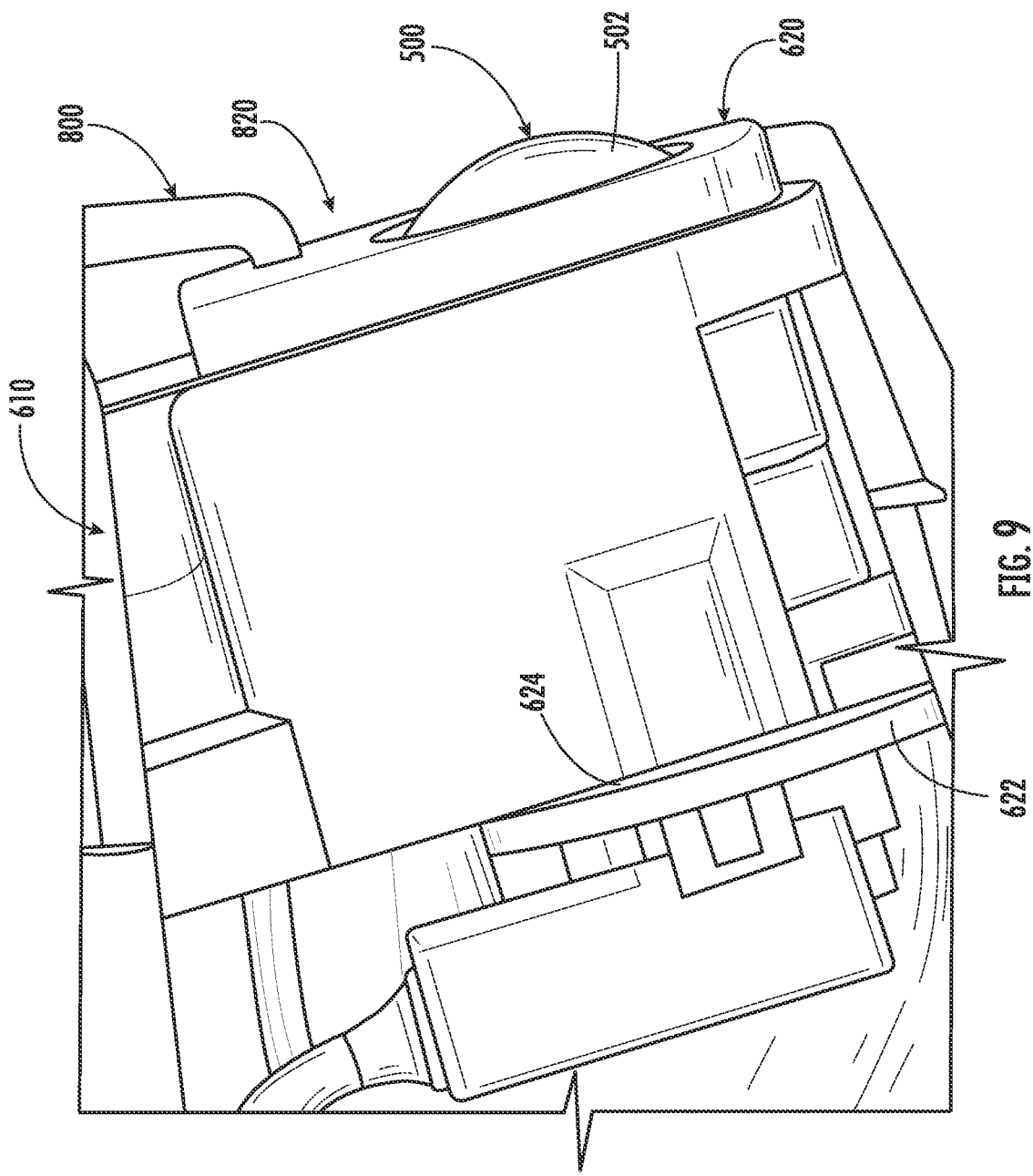
FIG. 9 depicts a cutaway view of a portion of the near-range camera assembly according to example embodiments of the present disclosure.

Referring now to FIGS. 8 and 9, the first near-range camera assembly 310 (FIG. 4) and the second near-range camera assembly 312 (FIG. 4) can each include a cover 800 to hide the mounting assembly 600 (FIG. 5) from view. As shown, the cover 800 can define a first opening 810 to accommodate housing 410 (FIG. 4) of the LIDAR unit 400 (FIG. 4). In addition, the cover 800 can define a second opening 820 to accommodate the camera housing 620. For instance, a portion (e.g., lens) of the camera 500 can be positioned within the second opening 820 when the camera 500 is positioned within the camera housing 620 and the cover 800 is positioned over the mounting assembly 600.

In some implementations, the cover 800 can include a backboard 830 and a hoop 840 defining the first opening 810 to accommodate the LIDAR unit 400. In this manner, the shape of the first opening 810 can correspond to the shape of the housing 410 (FIG. 4) of the LIDAR unit 400. More particularly, the backboard 830 and the hoop can contact the housing 410 of the LIDAR unit 400 to prevent debris (e.g., rocks, dirt, etc.) from accumulating on the LIDAR mount 610 (FIG. 5).

In some implementations, the first near-range camera assembly 310 and the second near-range camera assembly 312 can each include a retention plate 622 positioned to retain the camera 500 within a cavity defined by the camera housing 620. In addition, the first near-range camera assembly 310 and the second near-range camera assembly 312 can each include a spring plate 624 positioned between the retention plate 622 and the camera housing 620 such that the spring plate 624 exerts a force on the camera 500. In this manner, the camera 500 can be retained within the camera housing 620.

Figure 10:
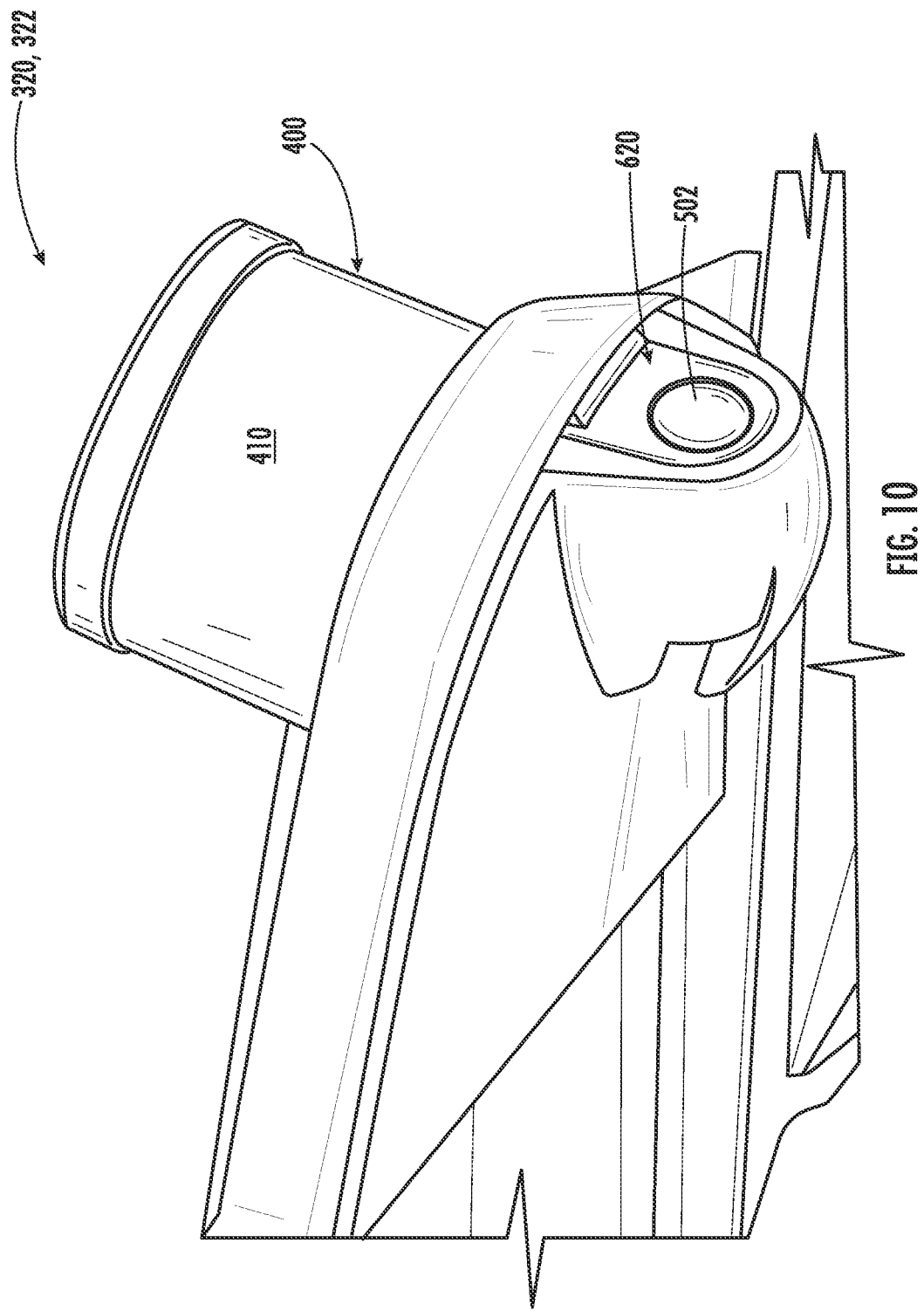
FIG. 10 depicts another near-range camera assembly according to example embodiments of the present disclosure.

Referring now to FIG. 10, the third near-range camera assembly 320 and the fourth-near-range camera assembly 322 are provided according to example embodiments of the present disclosure. The third near-range camera assembly 320 and the fourth near-range camera assembly 322 can be configured in substantially the same manner as the first near-range camera assembly 310 and the second near-range camera assembly 312 discussed above with reference to FIGS. 3-9. For instance, the third near-range camera assembly 320 and the second near-range camera assembly 322 can each include the LIDAR unit 400. Furthermore, the third near-range camera assembly 320 and the second near-range camera assembly 322 can each include the camera 500 and the camera housing 620. It should be understood that the LIDAR unit 400 and the camera housing 620 of the third and fourth near-range camera assemblies 320, 322 are each coupled to a LIDAR mount. Furthermore, it should be understood that the camera housing 620 is coupled to the LIDAR mount such that the camera is tilted relative to the LIDAR mount at an acute angle (e.g., less than 20 degrees). In this manner, a field of view associated with the camera 500 can intersect with a field of view associated with the LIDAR unit 400.

Figure 11:
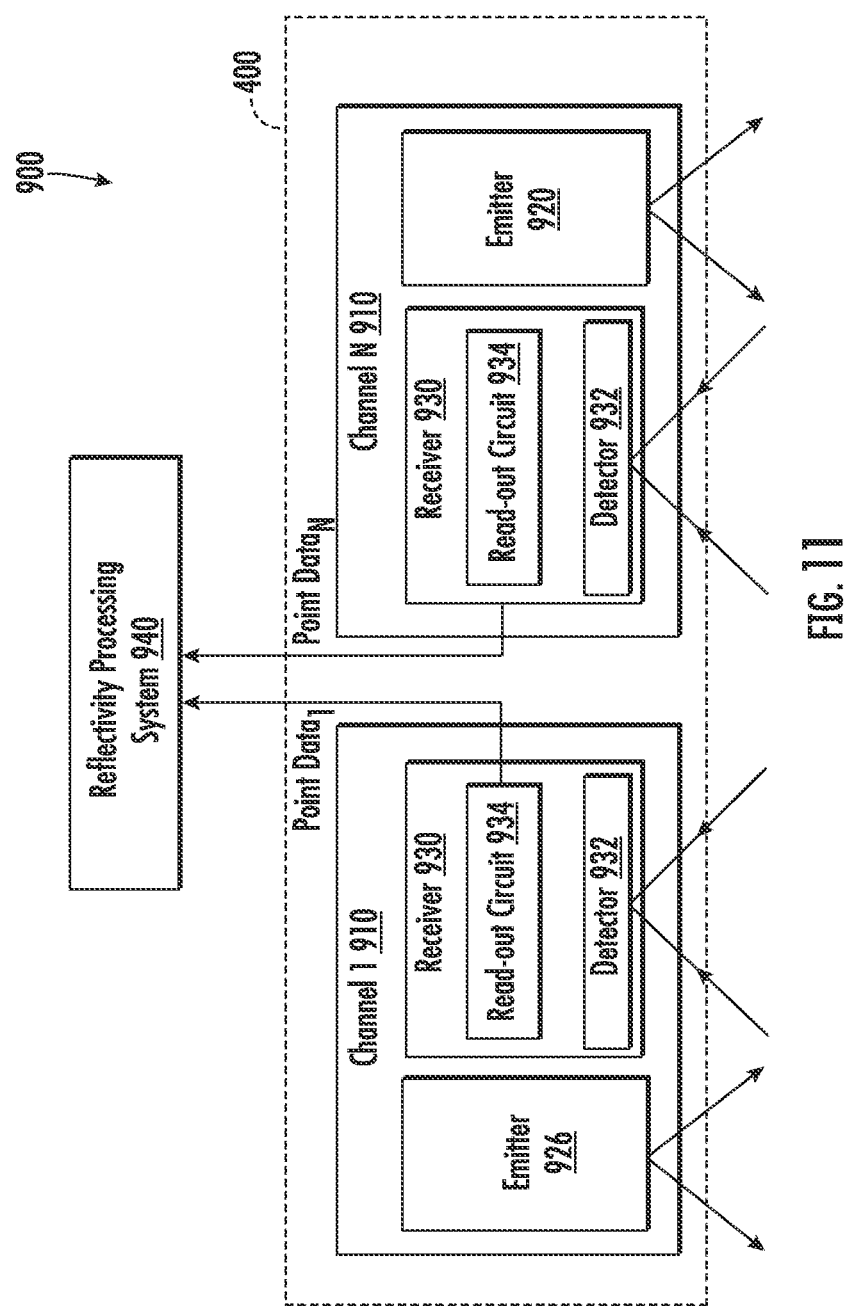
FIG. 11 depicts a block diagram of components of a LIDAR unit according to example embodiments of the present disclosure.

Referring now to FIG. 11, a block diagram of a LIDAR system 900 is provided according to example embodiments of the present disclosure. It should be understood that the LIDAR system 900 can be included as part of the sensors 135 discussed above with reference to FIG. 1. As shown, the LIDAR system 900 can include multiple channels 910; specifically, channels 1-N are illustrated. It should be understood that channels 1-N can be included in a single LIDAR unit 400 or may be spread across multiple LIDAR units 400. Each channel 910 can output point data that provides a single point of ranging information. The point data output by each of the channels 910 (e.g., point data$_{1-N}$) can be combined to create a point cloud that corresponds to a three-dimensional representation of the surrounding environment.

As shown, each channel 910 can include an emitter 920 paired with a receiver 930. The emitter 920 emits a laser signal into the environment that is reflected off the surrounding environment and returned back to a detector 932 (e.g., an optical detector) of the receiver 930. Each emitter 920 can have an adjustable power level that controls an intensity of the emitted laser signal. The adjustable power level allows the emitter 920 to be capable of emitting the laser signal at one of multiple different power levels (e.g., intensities).

The detector 932 can provide the return signal to a read-out circuit 434. The read-out circuit 934 can, in turn, output the point data based on the return signal. The point data can indicate a distance the LIDAR system 900 is from a detected object (e.g., road, pedestrian, vehicle, etc.) that is determined by the read-out circuit 934 by measuring time-of-flight (ToF), which is the time elapsed time between the emitter 920 emitting the laser signal and the receiver 930 detecting the return signal.

The point data further includes an intensity value corresponding to each return signal. The intensity value indicates a measure of intensity of the return signal determined by the read-out circuit 934. As noted above, the intensity of the return signal provides information about the surface reflecting the signal and can be used by the autonomy computing system 140 (FIG. 1) for localization, perception, prediction, and/or motion planning. The intensity of the return signals depends on a number of factors, such as the distance of the LIDAR system 900 to the detected object, the angle of incidence at which the emitter 920 emits the laser signal, temperature of the surrounding environment, the alignment of the emitter 920 and the receiver 930, and the reflectivity of the detected surface.

As shown, a reflectivity processing system 940 receives the point data from the LIDAR system 900 and processes the point data to classify specular reflectivity characteristics of objects. The reflectivity processing system 940 classifies the specular reflectivity characteristics of objects based on a comparison of reflectivity values derived from intensity values of return signals. In some embodiments, the LIDAR system 900 can be calibrated to produce the reflectivity values. For example, the read-out circuit 934 or another component of the LIDAR system 900 can be configured to normalize the intensity values to produce the reflectivity values. In these embodiments, the reflectivity values may be included in the point data received by the reflectivity processing system 940 from the LIDAR system 900. In other embodiments, the reflectivity processing system 940 may generate the reflectivity values based on intensity return values included in the point data received from the LIDAR system 900.

Regardless of which component is responsible for generating the reflectivity values, the process for doing so may, in some embodiments, include using a linear model to compute one or more calibration multipliers and one or more bias values to be applied to return intensity values. Depending on the embodiment, a calibration multiplier and bias value may be computed for and applied to each channel of the LIDAR system 900 at each power level. The linear model assumes a uniform diffuse reflectivity for all surfaces and describes an expected intensity value as a function of a raw intensity variable, a calibration multiplier variable, and/or a bias variable. The computing of the calibration multiplier and bias value for each channel/power level combination includes determining a median intensity value based on the raw intensity values output by the channel at the power level and using the median intensity value as the expected intensity value in the linear model while optimizing values for the calibration multiplier variable and bias variable. As an example, the calibration multiplier and bias value may be computed by solving the linear model using an Iterated Re-weighted Least Squares approach.

The calibration multiplier and bias value computed for each channel 910 at each power level can be assigned to the corresponding channel/power level combination. In this way, each power level of each channel of the LIDAR system 900 can have an independently assigned calibration multiplier and bias value from which reflectivity values may be derived. Once assigned, the calibration multiplier and bias value of each channel/power level combination can be used at run-time to determine reflectivity values from subsequent intensity values produced by the corresponding channel at the corresponding power level during operation of an autonomous or semi-autonomous vehicle. More specifically, reflectivity values can be determined from the linear model by using the value of the calibration multiplier and the bias value for the calibration multiplier variable and bias variable, respectively. In this manner, the intensity values can be normalized to be more aligned with the reflectivity of a surface by taking into account factors such as the distance of the LIDAR system 900 to the detected surface, the angle of incidence at which the emitter 920 emits the laser signal, temperature of the surrounding environment, and/or the alignment of the emitter 1120 and the receiver 930.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A sensor platform for mounting a light detection and ranging (Lidar) unit and a camera to an autonomous vehicle, the sensor platform comprising:
a Lidar mount couplable to the autonomous vehicle, the Lidar mount comprising a first surface and a second surface that is different from the first surface, the Lidar mount defining a first aperture and a second aperture, the first aperture and the second aperture respectively extending through the first surface of the Lidar mount and the second surface of the Lidar mount;
a camera mount; and
a cover for the Lidar mount and the camera mount, the cover including a backboard and a hoop extending from the backboard to define a first opening for the Lidar unit, the cover further defining a second opening for the camera,
wherein the Lidar unit is couplable to the first surface of the Lidar mount with a first fastener configured to extend through the first aperture of the Lidar mount, and
wherein the camera mount is couplable to the second surface of the Lidar mount with a second fastener configured to extend through the second aperture of the Lidar mount.

2. The sensor platform of claim 1, wherein the camera mount defines an opening configured to accommodate a lens of the camera.

3. The sensor platform of claim 1, further comprising:
a spring plate positioned to retain the camera within a cavity defined by the camera mount.

4. The sensor platform of claim 1, wherein the Lidar mount is couplable to a grille of the autonomous vehicle.

5. An autonomous vehicle comprising:
a vehicle body; and
a plurality of camera assemblies respectively coupled to the vehicle body at different locations, at least one camera assembly of the plurality of camera assemblies comprising:
a sensor platform comprising a light detection and ranging (Lidar) mount and a camera mount, the Lidar mount coupled to the vehicle body, the Lidar mount comprising a first surface and a second surface that is different from the first surface, the Lidar mount defining a first aperture and a second aperture, the first aperture and the second aperture respectively extending through the first surface of the Lidar mount and the second surface of the Lidar mount, the camera mount coupled to the second surface of the Lidar mount with a first fastener configured to extend through the first aperture, the camera mount defining a cavity;
a Lidar unit coupled to the first surface of the Lidar mount with a second fastener configured to extend through the second aperture;
a camera positioned within the cavity defined by the camera mount; and
a cover for the Lidar mount and the camera mount, the cover including a backboard and a hoop extending from the backboard to define a first opening for the Lidar unit, the cover further defining a second opening for the camera.

6. The autonomous vehicle of claim 5, wherein the plurality of camera assemblies comprise:
a first camera assembly coupled to a front bumper of the vehicle body; and
a second camera assembly coupled to a rear bumper of the vehicle body.

7. The autonomous vehicle of claim 6, wherein the plurality of camera assemblies further comprise:
a third camera assembly coupled to a first door frame of the autonomous vehicle; and
a fourth camera assembly coupled to a second door frame of the autonomous vehicle, the second door frame spaced apart from the first door frame along a lateral direction of the vehicle body.

8. The autonomous vehicle of claim 5, further comprising:
a first cleaning system configured to clean debris from a housing of the Lidar unit; and
a second cleaning system configured to clean debris from a lens of the camera.

9. The autonomous vehicle of claim 5, wherein the camera mount defines an opening configured to accommodate a lens of the camera.

10. The autonomous vehicle of claim 5, wherein the at least one camera assembly further comprises:
a retention plate configured to retain the camera within the cavity defined by the camera mount; and
a spring plate positioned between the camera mount and the retention plate.

11. The autonomous vehicle of claim 5, wherein:
the Lidar unit contacts the first surface of the Lidar mount; and
the camera mount contacts the second surface of the Lidar mount.

12. The autonomous vehicle of claim 5, wherein the camera is tilted at an acute angle relative to the Lidar mount.

13. The autonomous vehicle of claim 5, wherein the camera has a 360 degree field of view.

14. An autonomous vehicle control system comprising:
a sensor platform comprising a Lidar mount and a camera mount, the Lidar mount couplable to an autonomous vehicle, the Lidar mount comprising a first surface and a second surface that is different than the first surface, the Lidar mount defining a first aperture and a second aperture, the first aperture and the second aperture respectively extending through the first surface of the Lidar mount and the second surface of the Lidar mount, the camera mount coupled to the second surface of the Lidar mount with a first fastener configured to extend through the first aperture defined by the Lidar mount, the camera mount defining a cavity;
a Lidar unit coupled to the first surface of the Lidar mount with a second fastener configured to extend through the second aperture defined by the Lidar mount; and
a camera positioned within the cavity defined by the camera mount,
wherein the sensor platform further comprises a cover for the Lidar mount and the camera mount, the cover including a backboard and a hoop extending from the backboard to define a first opening for the Lidar unit, the cover further defining a second opening for the camera.

15. The sensor platform of claim 1, wherein the Lidar mount is couplable to the autonomous vehicle with a third fastener configured to extend through a third aperture defined by the Lidar mount.

16. The autonomous vehicle of claim 5, wherein:
the Lidar unit includes a cylindrical housing; and
the hoop of the cover extends around at least a portion of the cylindrical housing.

17. The autonomous vehicle of claim 12, wherein the acute angle ranges from 5 degrees to 20 degrees.

18. The autonomous vehicle of claim 12, wherein a field of view of the camera overlaps with a field of view of the Lidar unit.

\* \* \* \* \*